HUBERT NERWIN
INVENTOR.

BY R. Frank Smith
Robert W. Hampton
ATTORNEYS

July 31, 1962            H. NERWIN            3,046,860

AUTOMATIC EXPOSURE CONTROL SYSTEM FOR PHOTOGRAPHIC CAMERAS

Filed Aug. 3, 1959            4 Sheets-Sheet 2

HUBERT NERWIN
INVENTOR.

BY *R. Frank Smith*
*Robert W. Hampton*
ATTORNEYS

HUBERT NERWIN
INVENTOR.

BY R. Frank Smith
Robert W. Hampton
ATTORNEYS

United States Patent Office 3,046,860
Patented July 31, 1962

3,046,860
AUTOMATIC EXPOSURE CONTROL SYSTEM
FOR PHOTOGRAPHIC CAMERAS
Hubert Nerwin, Rochester, N.Y., assignor to Eastman Kodak Company, Rochester, N.Y., a corporation of New Jersey
Filed Aug. 3, 1959, Ser. No. 831,355
6 Claims. (Cl. 95—10)

The present invention relates to photographic cameras and more particularly to automatic exposure control systems for such cameras.

Exposure meter housings with transparent windows have been made to protect the moving elements of such meters from dust and other foreign particles. A meter of this type, as employed on a camera, usually produces a scale reading that must be transferred manually to a diaphragm or shutter setting mechanism in the camera. In more advanced camera designs an enclosed meter is used in conjunction with a follow-up pointer which is adapted to be visually aligned with the meter pointer for transferring the meter reading to the exposure setting mechanism. A system of the latter type is known in the art as a semi-automatic exposure control system.

In a fully automatic exposure control system some exposure-controlling part of the camera is linked mechanically with the meterpointer or with some other device moved by the meter. According to the present invention, which comprises a fully automatic system, a first sensing device is arranged within the meter housing for sensing the position of the meter pointer in such manner as to permit the automatic positioning of a second pointer outside the housing in conformance with the position of the meter pointer. The invention is illustrated in the accompanying drawings and description as applied to a still camera having an automatic exposure control system of the "trapped-pointer" type, but its application to other forms of automatic exposure control systems will be evident to those skilled in the art.

It is therefore a primary object of the invention to automatically adjust an exposure control mechanism of a camera as a function of the energization of an exposure meter, the movable elements of which are enclosed in a dust-resistant housing.

A further object of the invention is to sense the position of the moving element of an exposure meter inside a housing, to transmit a manifestation of that position to a member outside of the housing and to sense such manifestation for setting an exposure-control member of a camera automatically as a function of the energization of the meter by scene light. This object is achieved, according to one form of the invention, by employing trapped-pointer sensing of the meter pointer inside the housing in order to position a second pointer outside the housing, which is connected to the inner sensing device through a housing seal. The outer pointer is then sensed by a second, outer sensing device, which is coupled to an exposure-setting mechanism of the camera. By employing the foregoing sensing structure the outer pointer, which is moved with the inner sensing device, can be built sturdily and operated between two rigid stops and its angular increments of movement can be determined with great latitude, e.g., such increments can be linear or nonlinear as the design requirements dictate.

Other objects of the invention will be apparent from the following description, reference being made to the accompanying drawings, wherein.

Figure 1:
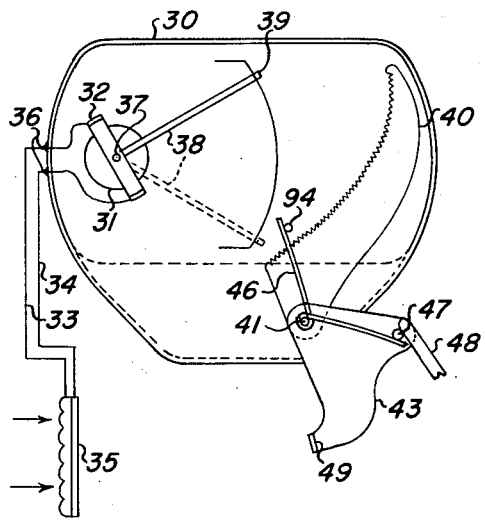
FIG. 1 is a cutaway top view of an enclosed galvanometer according to the invention wherein the axis of the outer pointer is parallel to the axis of the galvanometer coil.
Figure 2:
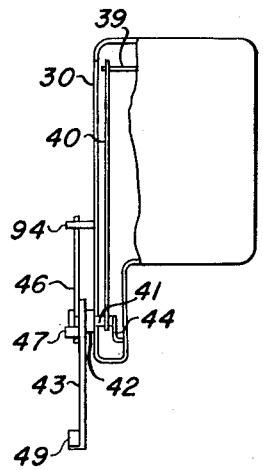
FIG. 2 is a partially cutaway right side view of the mechanism shown in FIG. 1.

Referring to FIGS. 1 and 2, housing 30 contains the moving element of a light meter illustrated as a pivoted-coil galvanometer 31. The coil 32 of the galvanometer is connected by leads 33 and 34 to a photocell 35 which is exposed to scene light. Leads 33 and 34 may enter housing 30 through suitable seals 36 familiar to those skilled in the art, or the photocell may be located within the housing. In accordance with the usual operation of such meters, coil 32 assumes an angular position about its axis 37, which is a function of the scene brightness. A first, or inner pointing member comprises pointer 38, which is secured to coil 32 and moves angularly with that coil inside housing 30 to represent, by its position, the value of scene brightness in arbitrary units. A turned end 39 of pointer 38 extends out of the plane of angular movement of that pointer into the path of an inner sensing device, illustrated as a serrated blade 40, which also is enclosed within housing 30. Blade 40 is mounted on a post 41 that extends through a sealing mechanism 42 to the outside of the housing. A second or outer pointing member 43 is mounted on post 41 on the outside of housing 30 for rotation with blade 40 and has an ear 49 which is adapted to be sensed by an outer sensing device as subsequently described. Blade 40 is urged toward sensing relation with pointer end 39 by a spring 46 but normally is maintained out of sensing engagement with the pointer by the engagement of a pin 47 with an arm 48 on a control member described hereinafter.

Figure 3:
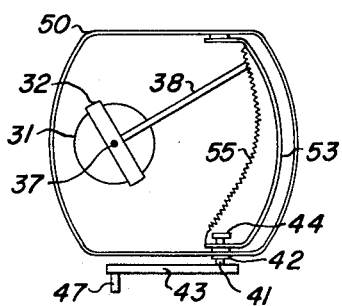
FIG. 3 is a cutaway top view of an enclosed galvanometer wherein the axis of the outer pointer is perpendicular to the axis of the galvanometer coil.
Figure 4:
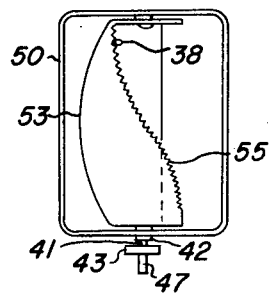
FIG. 4 is a cutaway right side view of the mechanism shown in FIG. 3.
Figure 5:
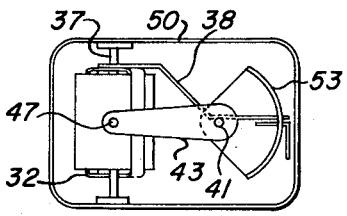
FIG. 5 is a cutaway front view of the mechanism shown in FIGS. 3 and 4.
Figure 8:
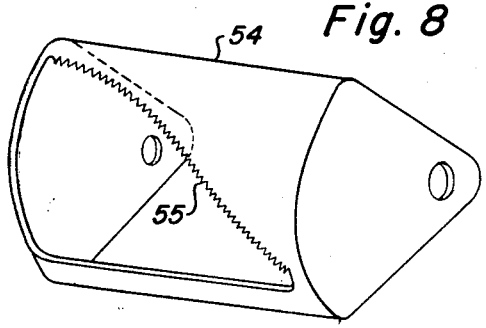
FIG. 8 is an isometric view of an alternate form of the inner sensing device.
Figure 9:
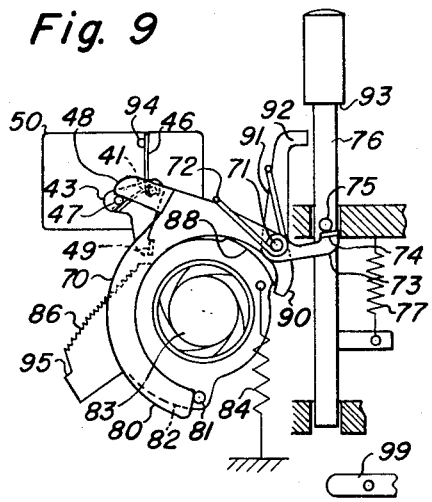
FIGS. 9–12 are front views of an automatic exposure control system according to the invention, shown in each of its four principal operating positions.

It will be noted that in the examples shown in FIGS. 1 and 2 the common axis of blade 40 and the outer pointing member 43 is parallel to that of the galvanometer coil 32. In FIGS. 3–5 there is shown an alternate structure wherein the axis 37 of the galvanometer coil is perpendicular to the common axis 41 of the inner sensing device 53 and the outer pointing member 43. In this embodiment the inner sensing device may have the open form shown at 53 in FIGS. 3–5 and 7 or it may have a more rigid closed form shown at 54 in FIG. 8. In either case it has a serrated edge 55 that cooperates with the meter pointer 38 to position the inner sensing device and member 43 as a function of scene brightness.

Figure 6:
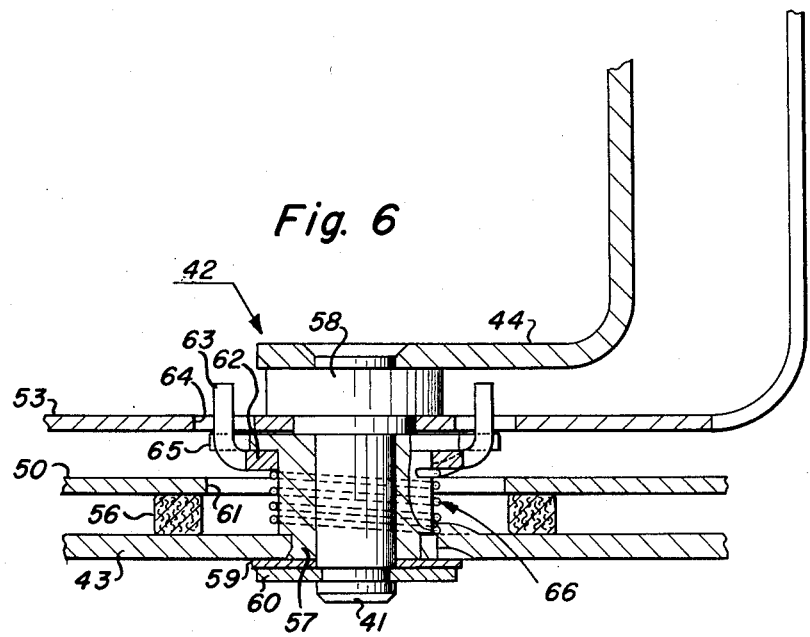
FIG. 6 is a sectional top view of a preferred form of housing seal.
Figure 7:
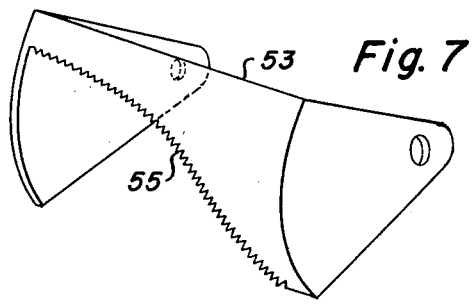
FIG. 7 is an isometric view of one form of the inner sensing device.

The preferred form of sealing mechanism 42 is illustrated in FIG. 6 and comprises a felt or similar sealing ring 56 disposed between the outer pointing member 43 and the outer wall of housing 50. Member 43 is riveted to a bushing 57 which is mounted on post 41 for free rotation thereon. Post 41 is riveted to a fixed member 44 inside the housing and has a collar 58 which spaces member 44 from the inner sensing device 53. Bushing 57 is secured to post 41 by a washer 59 and a C-ring 60 and enters the housing 50 through an aperture 61. A bracket 62 is rotatably mounted on bushing 57 and has fingers such as 63 which engage complementary holes 64 in the inner sensing device 53 for holding the bracket and the inner sensing device in fixed angular relation. Ears such as 65 on bushing 57 cooperate with fingers 63 on bracket 62 for limiting the relative angular movement between the bushing and the bracket. A spring 66 is secured to the bracket 62 and constitutes a yieldable drive link between the outer pointing member 43 and the inner sensing device 53. The drive train thus comprises member 43, spring 66, bracket 62 and the inner sensing device 53.

Figure 11:
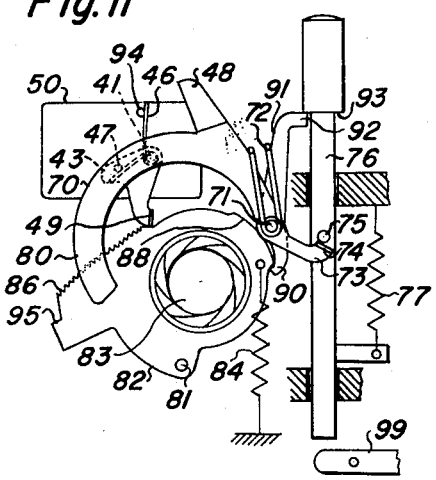
Figure 12:
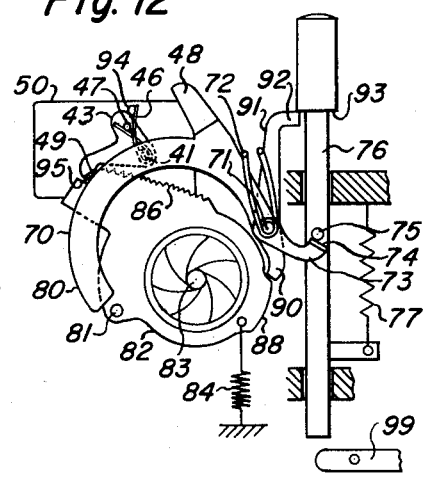
Figure 13:
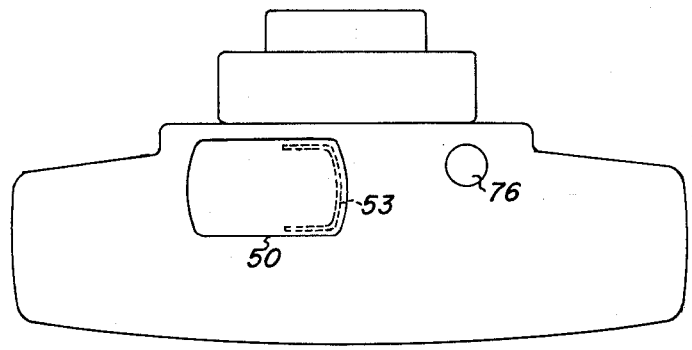
FIGS. 13 and 14 illustrate the spatial relation between the exposure control system of FIGS. 9–12 and the body of a still camera.
Figure 14:
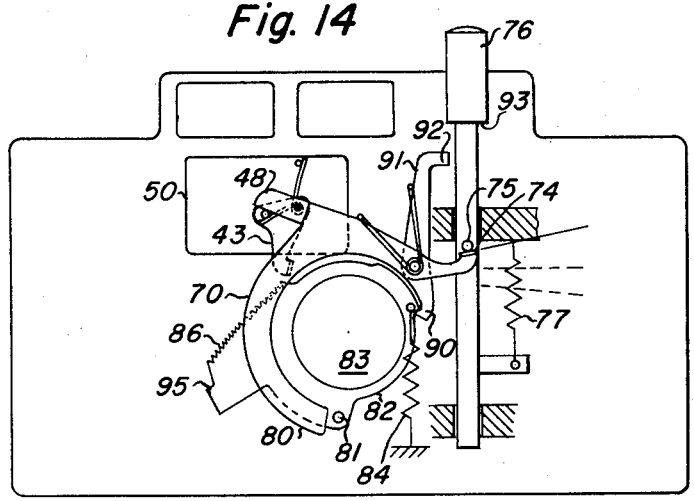

The cooperation of the above described enclosed sensing system with the exposure control mechanism of a camera is illustrated in FIGS. 9–12; this structure is shown in its spatial relation to the body of a camera in FIGS. 13 and 14. The invention is illustrated in these drawings as embodied in means for automatically regulating a lens diaphragm. It will be understood that the invention also applies to regulation of shutter speed or other exposure factors singly or in combination.

In FIGS. 9–12, the outer pointing member 43 is shown reversed from its position of FIGS. 1 and 2 and is urged clockwise about post 41 by spring 46. In the rest position of the exposure control system, pin 47 on member 43 engages the previously mentioned arm 48 on a control member 70, which is urged counterclockwise about a pivot 71 by a spring 72. Spring 72 is stronger than spring 46; therefore, arm 48 maintains member 43 in its counterclockwise position so that the inner sensing device is out of sensing engagement with the meter pointer. A second arm 73 on control member 70 has an ear 74 underlying a pin 75 on the shutter release member 76 of the camera. Member 76 is guided for vertical motion and normally is maintained in its upward position by a spring 77 which is lighter than spring 72. When member 76 is manually depressed against the tension of spring 77, pin 75 forces ear 74 downward, thereby rocking member 77 clockwise about pivot 71 and permitting spring 46 to rock member 43 clockwise about post 41. This brings the inner sensing device into engagement with the meter pointer for stopping member 43 at a position which represents the scene brightness.

Figure 10:
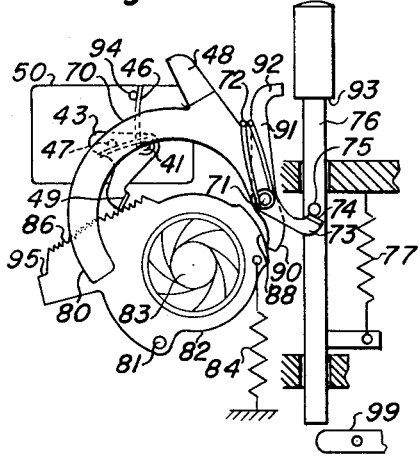

A third arm 80 on the control member 70 normally engages a pin 81 on the diaphragm-setting ring 82 of the camera. This setting ring is urged clockwise about the axis of the taking lens 83, in the direction of reduced diaphragm aperture, by a spring 84 which is lighter than spring 72. In the rest position of the exposure control mechanism, the setting ring 82 is prevented from moving clockwise by the engagement of pin 81 and arm 80. When the shutter release member 76 is manually depressed to permit the control member 70 to rock clockwise about pivot 71, the movement of arm 80 permits spring 84 to rock the setting ring 82 clockwise until a serrated blade 86 on the setting ring engages the previously described ear 49 on member 43, as shown in FIG. 10. Blade 86 constitutes the outer sensing device; its engagement with ear 49 prevents further movement of the diaphragm setting ring 82 and establishes the diaphragm opening at a value corresponding to the position of member 43 and therefore corresponding to scene brightness.

The diaphragm setting ring 82 has a raised peripheral cam surface 88 subtending an angle that corresponds to the angular rotation of the setting ring from one extreme of the camera's exposure range to the other. Cam 88 cooperates with a follower 90 on a blocking lever 91 which is urged clockwise about pivot 71, by spring 72, into engagement with the periphery of the setting ring 82. If there is insufficient light for an exposure within the camera's normal range, member 43 is blocked early in its rotation and in turn blocks the setting ring 82 early in its rotation as illustrated in FIG. 11. In this case cam 88 does not ride under follower 90; therefore, lever 91 remains in its clockwise position where a nose 92 on that lever underlies a shoulder 93 on the shutter release member 76 and prevents full depression of the release member. If the scene brightness is too great for the camera's exposure range, member 43 rotates through its full range and engages a stop 94, thereby permitting the setting ring 82 to be rotated through its full range, after which the ring is stopped by engagement of a shoulder 95 on ear 49, as shown in FIG. 12. The full-range rotation of setting ring 82 moves cam 88 out from under follower 90 and permits lever 91 to be rocked clockwise so that nose 92 again engages follower 93 and prevents full depression of the release member 76. It should be noted in connection with FIG. 10 that when the scene brightness lies within the camera's normal exposure range, cam 88 underlies follower 90 during actuation of the release member 76 and therefore rocks nose 92 of lever 91 out of the path of shoulder 93 on the release member.

When the shutter-release member 76 is fully depressed, after the diaphragm or other exposure control mechanism has been set automatically as described above, the lower end of member 76 engages a shutter tripping member 99 for initiating the photographic exposure in a manner well known in the art.

The invention has been described in detail with particular reference to preferred embodiments thereof, but it will be understood that variations and modifications can be effected within the spirit and scope of the invention as described hereinabove and as defined in the appended claims.

I claim:
1. In a photographic camera having means for focusing an image of a viewed scene onto a photosensitive surface, and adjustable means for regulating the amount of scene light transmitted to said surface, the combination comprising: an exposure meter positioned for illumination by light from said scene and having a first pointing member positioned as a function of the intensity of said light; a rotatable shaft; a first sensing device mounted on said shaft for sensing the position of said first pointing member; a housing enclosing said meter and said first sensing member and having a seal through which said shaft extends; a second pointing member mounted on said shaft outside of said housing and positioned by said shaft as a function of the position of said first pointing member; a second sensing device for sensing the position of said second pointing member; and means coupling said second sensing device and said regulating means for adjusting the latter as a function of the position of said second pointing member, whereby the adjustment of said regulating means is a function of the intensity of said light.

2. In a photographic camera having means for focusing an image of a viewed scene onto a photosensitive surface, and adjustable means for regulating the amount of scene light transmitted to said surface, the combination comprising: an exposure meter positioned for energization by light from said scene and having a first pointing member positioned as a function of the intensity of said light; a first sensing device for sensing the position of said first pointing member; a second pointing member coupled to said first sensing device and positioned thereby as a function of the position of said first pointing member; a second sensing device for sensing the position of said second pointing member; means coupling said second sensing device and said regulating means for adjusting the latter as a function of the position of said second pointing member, whereby the adjustment of said regulating means is a function of the intensity of said light; control means cooperating with each of said sensing devices and normally positioned for maintaining the latter out of sensing relation with the respective pointing members; first drive means for moving said control means; and second and third drive means interrelating said control means and the respective sensing devices for moving the latter into sensing relation with the respective pointing members in response to movement of said control means.

3. The combination defined in claim 2, with: limit means movable in timed relation with one of said sensing devices to represent by its position the intensity of said light; and a blocking member interrelating said limit means and said first drive means for blocking said first drive means when said limit means occupies any position outside of a predetermined range.

4. The combination defined in claim 3, wherein said limit means comprises a cam surface integral with said second sensing device, said blocking member comprises a follower in sensing relation with said cam surface, and said first drive means comprises a manually movable shutter-release member.

5. In a photographic camera having means for focusing an image of a viewed scene onto a photosensitive surface, adjustable means for regulating the admission of scene light to said surface, and an exposure meter positioned for illumination by said light and having a movable member positioned as a function of scene brightness, the combination comprising; exposure control mechanism interrelating said movable member and said regulating means for adjusting the latter in accordance with the position of said movable member; a protective housing enclosing said movable member and a first part of said exposure control mechanism; and means for sealing an aperture in said housing through which a second part of said exposure control mechanism extends.

6. The combination defined in claim 5, wherein said sealing means includes a ring surrounding said aperture and formed of fiber.

References Cited in the file of this patent

UNITED STATES PATENTS

| | | |
|---|---|---|
| 2,061,909 | Karg | Nov. 24, 1936 |
| 2,065,834 | Swennes | Dec. 29, 1936 |
| 2,417,108 | Guibert et al. | Mar. 11, 1947 |

FOREIGN PATENTS

| | | |
|---|---|---|
| 667,821 | Germany | Nov. 21, 1938 |